May 11, 1943.  H. M. DODGE  2,318,841
UPHOLSTERY CUSHION
Filed Dec. 26, 1940

INVENTOR
*Howard M. Dodge*
BY *Evans & Meloy*
ATTORNEYS

Patented May 11, 1943

2,318,841

UNITED STATES PATENT OFFICE 2,318,841

UPHOLSTERY CUSHION

Howard M. Dodge, Wabash, Ind., assignor to The General Tire & Rubber Company, Akron, Ohio, a corporation of Ohio Application December 26, 1940, Serial No. 371,636

2 Claims. (Cl. 155—179)

This invention relates to the upholstery art, and more particularly to an improved device for cushioning upholstered articles.

The fabric, leather, or other covering material of upholstered articles is customarily separated from the supporting framework by a cushion or pad. Such an arrangement prolongs the life of the upholstery and improves the appearance of the article. Various materials have been used for such upholstery padding or cushioning, including various felted materials, rubber sponge and the like. However, in the manufacture of a large number of identical upholstered articles it is desirable to have a cushion or pad that can be made quickly and easily in quantity at a low unit cost, and one which will give long service without becoming wadded or deformed, and which will prevent upholstery wear. It is, therefore, an object of this invention to provide a generally improved pad or cushion for upholstery which is resistant to wear and imparts wearing qualities to the upholstery and which may be easily and economically made in large quantities.

Another object is to provide a cushion or pad for upholstery which may be made of relatively cheap rubber material and which retains its elasticity and resilience for a long period of time.

Another object is to provide a molded rubber upholstery pad or cushion which utilizes a relatively small amount of raw material and which incorporates integral means for attaching the cushion to the supporting framework of the article to be upholstered. More specifically, the invention aims to provide an improved cushion or the like of molded rubber which is particularly suited for use in upholstering automobile arm rests and the like. Other objects and advantages will become apparent from the following detailed description of an arm rest cushion, or pad, embodying the invention.

Figure 1:
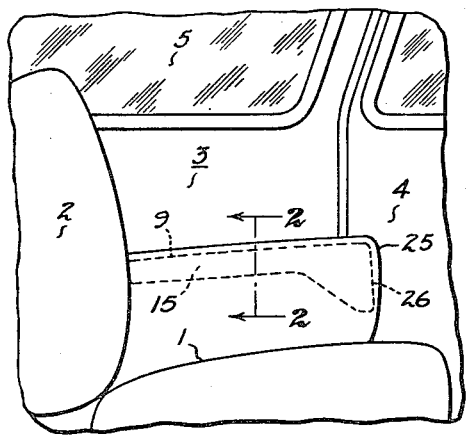
Figure 1 is a fragmentary elevational view, somewhat diagrammatic, showing my improved cushion in an arm rest alongside the rear seat of an automobile.

Referring to Fig. 1, the improved cushion or pad is shown in broken lines underlying upholstery covering 25 for the arm rest in the rear compartment of an automobile. The arm rest is shown located in the angle between seat 1 and back 2 alongside body side wall 3 of the vehicle, the latter having the usual door 4 and window 5.

The side wall or panel 3 of the automobile may be provided with a suitable nailing strip or the like, indicated at 6, to which is secured a bracket 7 carrying in substantially horizontal position a support member 8 which, if desired, may be of wood or similar material. The support 8 constitutes the frame of the device to be upholstered, in this instance the arm rest. Therefore, in plan the support 8 is shaped to conform to the desired curvature of the arm rest.

Figure 3:
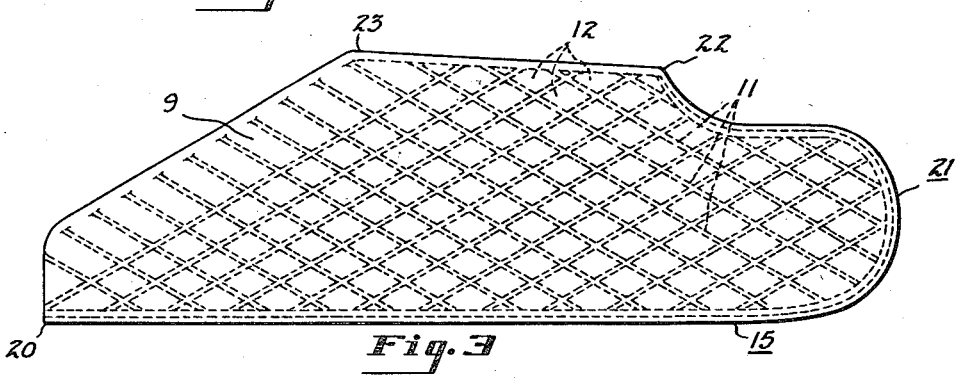
Fig. 3 is a top plan view of my improved arm rest.

Surmounting the support 8 is my improved cushion or pad which comprises a relatively thin sheet-like member or cover 9 which is shaped to correspond to the desired peripheral contour of the finished article or arm rest, see Fig. 3. This sheet member or portion 9 is formed of elastic and resilient rubber composition which may consist chiefly of relatively inexpensive reclaimed rubber stock. On the underside of the sheet-like portion or cover 9 and separating the same from flat upper surface 10 of the support 8 are a multiplicity of relatively thin intersecting ribs or fins 11. These ribs are preferably formed integral with the cover or sheet member 9 and seat edgewise against the flat surface 10 of the support 8.

As shown in Fig. 3, the ribs 11 are formed in two groups which intersect one another, the ribs of each group being parallel to one another. Each of the ribs 11 is considerably deeper than it is thick and the ribs are separated from one another by diamond shaped spaces 12. The ribs or fins 11 are in general three to five, preferably four times as deep as they are thick in order to be readily collapsed upon the application of edgewise pressure thereto. Furthermore, the spaces 12 are preferably about equal in depth and width so that proper mutual support is provided for the surrounding ribs. By making the individual ribs quite thin and arranging them so that they seat edgewise against the support 8, the resulting cushion is quite soft and yieldable so that when pressure is applied against the cover portion 9, the latter yields and the ribs supporting the particular portion to which the pressure is applied buckle or collapse locally.

Figure 2:
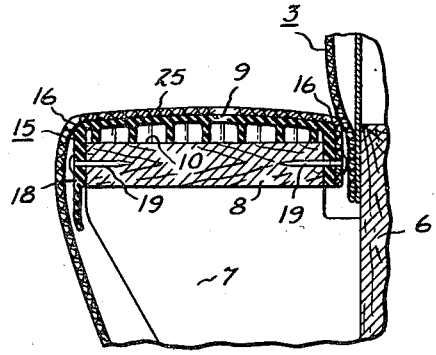
Fig. 2 is a sectional detail taken substantially on the line 2—2 of Fig. 1 and enlarged with respect thereto.

If desired, each of the ribs 11 may be made of tapering height from its end to the center, being shallower adjacent the edges of the cover or sheet-like portion 9 and higher towards the center of the latter. Thus, when the cushion or pad is secured in place, the sheet-like cover portion 9 is bowed upwardly in the middle to present the convex surface shown in Figs. 2 and 5.

Along the exposed or outwardly facing edge of the cushion there is formed a depending flange 15 integral with the sheet-like or cover portion 9. The ends of the ribs 11 may be integral with or formed into the flange 15 on the inside of the latter to support or reinforce edges 16 of the cushion.

Figure 4:
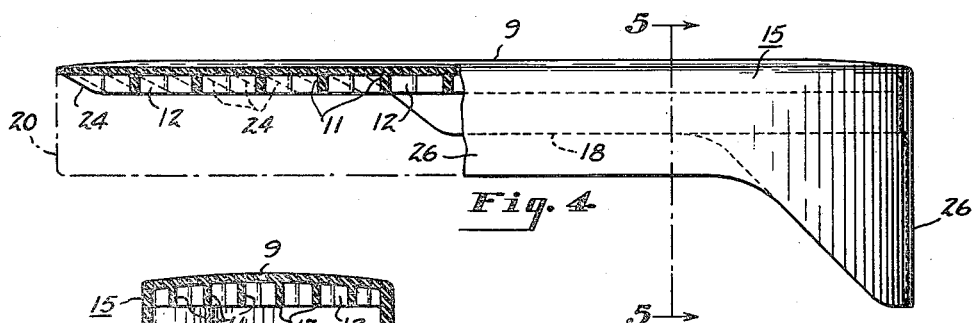
Fig. 4 is an elevational view of the cushion, partly in section and with parts removed.
Figure 5:
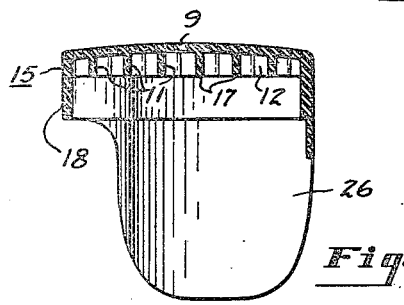
Fig. 5 is a sectional detail taken substantially on the line 5—5 of Fig. 4.

As shown to advantage in Fig. 5, the flange 15 extends from the sheet-like portion 9 in the same direction as the ribs 11 beyond free edges 17 of the ribs to provide an attaching portion or member 18, by means of which the cushion can be secured to the support 8. Preferably, the attaching portion 18 is made wider than the depth of the ribs 11 in order to provide ample space for securing the same to the support 8, as by means of fasteners such as nails 19. While the flange 15 and attaching strip 18 may extend around the entire periphery of the sheet-like portion or member 9, it is preferable when utilizing the cushion for upholstered articles such as automobile arm rests that the flange extend around a part only of the cushion periphery. For example, as shown in Fig. 3, the flange 15 may extend from rear corner 20 along the exposed or outer side of the sheet-like portion 9 the entire length of the cushion, thence about rounded heel portion 21 of the cushion or pad to inside front corner 22. The periphery or edge of the cover portion 9 along the rear or inside edge of the arm rest, for example, from the corner 20 to inside corner 23 and thence to corner 22, may be without either the flange 15 or the attaching strip 18. If this arrangement is utilized, it is preferable to taper the end portions of the ribs 11 toward the plane of the cover or sheet-like portion 9 along the edge of the latter as indicated at 24, Fig. 4. Accordingly, the portion or portions of the sheet-like member 9 along the edges of the same which do not have the depending flange 15 are disposed or lie closely adjacent to the upper surface 10 of the support 8 when the upholstery material 25, such as cloth or fabric, is drawn tightly over the top of the arm rest structure.

If desired, the arm rest may be partially assembled before being placed within the automobile. In such case the nails 19 along the inside edge of the support 8 may be used to secure the upholstery 25 in place, as shown, these nails being placed before the arm rest is positioned against the wall or panel 3 of the automobile.

Depending from the bottom edge of the attaching portion 18 is an apron 26 which may be of rubber integral with the flange 15 and extending as a continuation of the attaching portion 18 of the flange. The apron 26 may have any desired edge contour, preferably being deepest adjacent the rounded heel portion 21 of the arm rest to underlie exposed portions of the cover material 25 and thereby prevent excessive undercutting or undershaping of the upholstery. The apron 26 prevents the upholstery material 25 from being drawn tightly over sharp or abrupt edges of the framework and lends a neater and more attractive appearance to the completed article.

The improved cushion or pad provided by the present invention incorporates numerous novel features of construction. By forming the ribs 11 in integral fashion to the inside of the flange 15 and the underside of the cover or sheet member 9, the edge corner or crown 16 is made relatively rigid and this crown may be made to extend around the entire exposed edge of the finished arm rest or other similar upholstered article from the corner 20 shown in Fig. 3 around the heel portion 21 and terminating at the inside corner 22. The beveling or sloping of edge portions 24 of the ribs 11 allows the marginal portions of the sheet member 9 where there is no flange portion 15 to lie flatwise against the support member 8. Thus, the air is largely excluded from circulation under the cover 9 and oxidation of the rubber constituting the cushion or pad is minimized since the large surface area of the ribs 11 is mainly excluded from ambient air. The flange 15, including the integral attaching portion 18 and integral depending apron 26, provides a smooth outer surface for underlying the upholstery covering 25 and this arrangement improves the general appearance of the upholstered article since sharp corners and abrupt edges are avoided. Furthermore, cracks and crevices where dust and dirt might accumulate are eliminated, thus providing a more sanitary cushion or pad than porous or filamentous materials.

The principles of the present invention may be utilized in various ways, numerous modifications and alterations being contemplated, substitution of parts and changes in construction being resorted to as desired, it being understood that the embodiments shown in the drawing and described above are given merely for purposes of explanation and illustration without intending to limit the scope of the claims to the specific details disclosed.

What I claim is:

1. An article of manufacture for use in upholstery comprising a relatively thin flexible sheet-like member of rubber or the like having an angularly disposed integral flange along at least one edge thereof and intersecting ribs integral with the member and extending over one surface thereof, said ribs being formed into and integral with the flange and the flange being extended beyond the free edges of the ribs to provide a fastening strip for attaching the article to a support, said extended portion of the flange being at least in part thinner than the portion thereof into which the ribs are formed.

2. A cushion of rubber or the like comprising a sheet-like member having on one side thereof a network of integral intersecting ribs, a flange along at least one edge of the member and an apron extending as a continuation of the flange and thinner than the latter.

HOWARD M. DODGE.